Patented Jan. 14, 1930

1,743,606

UNITED STATES PATENT OFFICE

WILHELM HOPF, OF KIEL, GERMANY, ASSIGNOR TO FRIED. KRUPP GERMANIAWERFT AKTIENGESELLSCHAFT, OF KIEL-GAARDEN, GERMANY

WASTE-HEAT BOILER PLANT FOR INDUSTRIAL FURNACES

Application filed June 2, 1925, Serial No. 34,378, and in Germany July 11, 1924.

It is a well-known expedient to arrange in the rear of industrial furnaces (such as, for instance, forges, drying furnaces, kilns) from which the waste gases flow off in sufficient quantities and at comparatively high temperatures, waste-heat boilers for utilizing the heat of the waste gases. However, in most industrial furnaces the waste gases carry large quantities of dust or particles resulting from the furnace process which collect on the flue surfaces of the waste-heat boiler and thereby diminish the transmission of heat from the waste gases to the boiler water or endanger the life of the waste-heat boiler by chemical action on the boiler parts. Therefore these boilers have to be thoroughly cleaned and examined more often than ordinary water-tube boilers. In order to provide for working the industrial furnace while a boiler is being cleaned, the boilers are generally provided with shutting-off devices and passages through which the waste gases may be led past the waste-heat boiler. In the plants known hitherto, such passages are either placed in direct connection with the chimney in which case the heat contained in the waste gases is lost entirely, or the waste gases are supplied to the waste-heat boiler of an adjacent industrial furnace which, of course, is thereby exposed to double quantity of waste gas. The expedient of supplying the waste gases to neighbouring furnaces involves serious drawbacks. In view of the cost of installation waste-heat boilers of the kind in question are given just those dimensions as will enable them to utilize economically the quantity of waste gas of the furnaces to which they are appended. Therefore in case of a sudden increase of the waste gas quantity by 100 per cent, such as occurs upon admission of the waste gases of other furnaces, the working of the waste-heat boiler becomes uneconomical. It will therefore be evident that if a boiler is out of service for a long time, considerable quantities of heat will be lost. Moreover, a waste-heat boiler to which a double quantity of waste gases is supplied, will naturally deteriorate twice as fast and will have to be put out of service and cleaned or overhauled twice as often as a waste-heat boiler to which only the normal quantity of waste gases is supplied.

In view of these considerations, it is often preferred to use (during the time when a waste-heat boiler is being cleaned), a spare boiler with an independent fuel firing. However, the expense of the fuel required in this case increases the working costs enormously, while at the same time the considerable quantities of heat from the industrial furnaces are lost.

This invention has for its object to avoid such losses and frequent cleanings. This is attained by providing, in addition to the waste-heat boilers designed for the normal service, at least one spare boiler which is likewise constructed as a waste-heat boiler and which, in arrangement, construction and dimensions, answers the requirements of the industrial furnace waste-heat service in question. The spare boiler is not exclusively allotted to any particular industrial furnace, there being provided at least one by-pass channel outside the normal path of the waste gases of the industrial furnaces and which is adapted to be independently connected thru shutting-off devices (dampers or the like) with each furnace or group of furnaces without interfering in any way with other waste-heat boilers or industrial furnaces or disturbing the working thereof. The said by-pass channel opens into the flue of the spare boiler.

In the drawing the subject-matter of the invention is illustrated, by way of example, in connection with a cement-kiln plant.

The plant shown comprises two rotary cement-kilns $A^1$, $A^2$ with a waste-heat boiler plant $B^1$, $B^2$ for each and a spare boiler plant C. During the normal working, the waste gases which leave the rotary cement-kilns $A^1$, $A^2$ and still are very hot, first enter the dust chamber D arranged behind each kiln. From the said chamber the gases are drawn by fans E through the superheater F, the waste-heat water-tube boiler proper, G, and the feed-water heater H and then forced into the chimney J. The spare boiler plant C likewise comprises a superheater $F^1$, a water-tube boiler $G^1$ and a feed-water heater $H^1$. There are also arranged in rear of this boiler an induced draught fan $E^1$ and a chimney $J^1$. All of the three boilers are connected by a by-pass channel K which extends outside the normal waste-gas path of the furnaces and in which are arranged sliding dampers $k^1$, $k^2$. Besides, there are provided sliding dampers $k^3$, $k^4$, $k^5$. By opening or closing these dampers each rotary kiln and each waste-heat boiler may be connected to or shut off from the by-pass channel. During the normal working the dampers $k^3$, $k^4$ disposed in advance of the waste-heat boilers are open, while the dampers $k^1$, $k^2$ in the by-pass channel are closed so that the latter is entirely cut out. The hot waste gases coming from the rotary kiln take the path indicated by arrows in Fig. 1. If one of the waste-heat boiler plants, for instance $B^1$, has to be put out of service for the purpose of overhauling and cleaning, the damper $k^3$ is closed and the dampers $k^1$, $k^2$ in the by-pass channel are opened. The waste gases of the rotary kiln $A^1$ then pass through the dust chamber D of the waste-heat boiler plant $B^1$ and enter into the by-pass channel K from which they flow into the spare boiler plant C (Fig. 3) avoiding the boiler plant $B^2$. The working of the rotary kilns $A^1$, $A^2$ as well as of the waste-heat boiler plant $B^2$ may therefore go on as before without interruption.

In plants where the steam required may be wholly or mainly supplied by the waste-heat boilers, the spare waste-heat boilers are preferably provided also with an independent fuel firing so that in starting the plant or during and after long interruptions of service, steam may be generated until sufficient quantities of waste gases for the generation of the steam are available.

Figure 2:
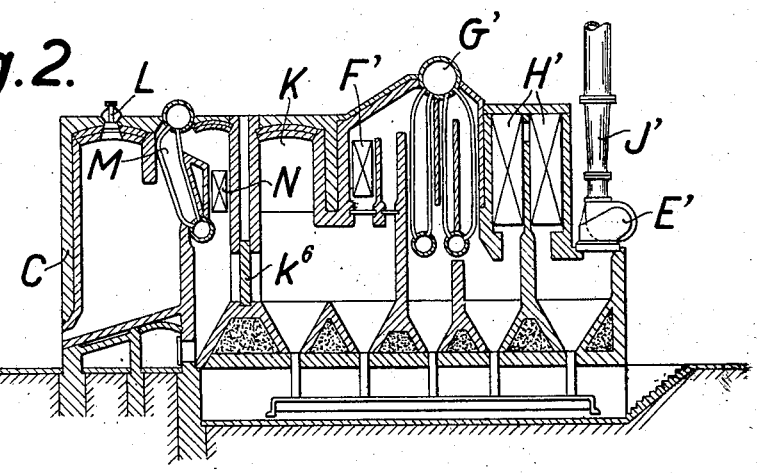
Fig. 2 is a longitudinal section through the spare boiler.
Figure 3:
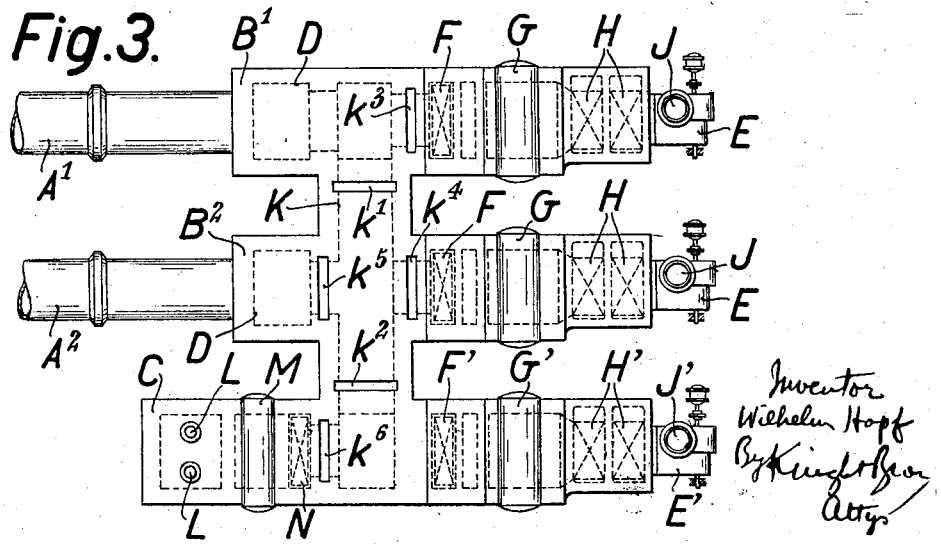
Fig. 3 is a plan of the entire plant.

The boiler shown in Figs. 2 and 3 has a construction of the kind indicated, the auxiliary firing being a coal-dust firing as shown at L at the left-hand end of the boiler C. Arranged beside the fire box is the auxiliary boiler M and a small superheater N. This auxiliary heating plant, when not in use, is adapted to be shut off from the spare waste-heat boiler $G'$ by means of a sliding damper $k^6$.

Figure 1:
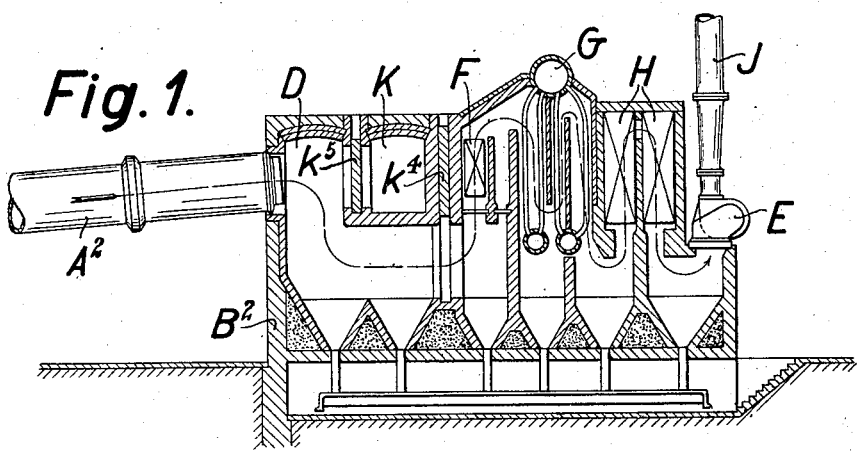
Fig. 1 is a longitudinal section through a waste-heat boiler plant, the rotary kiln being shown in elevation.

In the ordinary waste-heat boilers and as also shown in Fig. 1, the superheater F is arranged ahead of the boiler G proper in order to effect the desired superheating of the steam by the waste-gas temperature at disposal. If direct firing were applied before the spare waste-heat boiler shown in Figs. 2 and 3, the temperature of the gases of combustion would be much too high for the superheater F. In such spare waste-heat boilers provided with auxiliary firing, there is therefore arranged, (according to the invention) in front of the superheater, a small special auxiliary boiler which lies entirely outside the waste-gas current of the furnaces. The gases of combustion coming from the auxiliary firing L will then first enter into contact with the heating surface of the said auxiliary boiler which is of such dimensions as to cause the temperature of the heating gases to be reduced so much that it corresponds to the normal waste-heat service. Thereupon only the heating gases are fed to the superheater $F^1$ and the waste-heat boiler $G'$, $H'$.

Claims:

1. In combination, a plurality of industrial furnaces, a waste-heat boiler for each of said furnaces, and an extra waste-heat boiler, a common by-pass connecting the extra waste-heat boiler with all of said furnaces, and valves for selectively putting said extra waste-heat boiler into connection with any one of said furnaces, and closing the connection of said extra waste-heat boiler with the other furnaces.

2. The combination defined in claim 1, with auxiliary heating means associated with the extra waste-heat boiler.

3. The combination defined in claim 1, with auxiliary heating means associated with the extra waste-heat boiler, and an auxiliary boiler also associated with said auxiliary heating means in advance of said extra waste-heat boiler, for reducing the temperature of gases passing to said extra waste-heat boiler.

The foregoing specification signed at Hamburg, Germany, this 8th day of May, 1925.

WILHELM HOPF.